Figure 4:
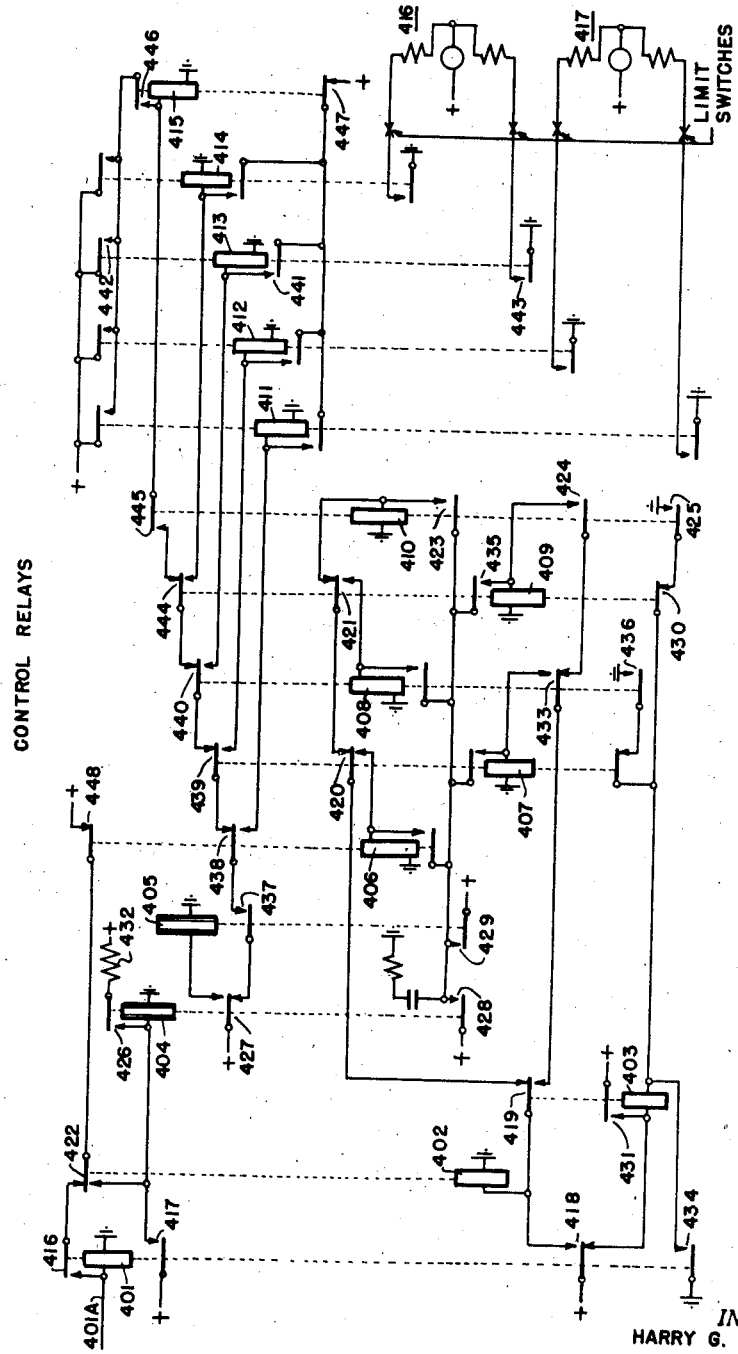

Nov. 4, 1947.                H. G. EVERS                 2,430,284
                         REMOTE CONTROL SYSTEM
              Original Filed Aug. 3, 1944      3 Sheets-Sheet 1
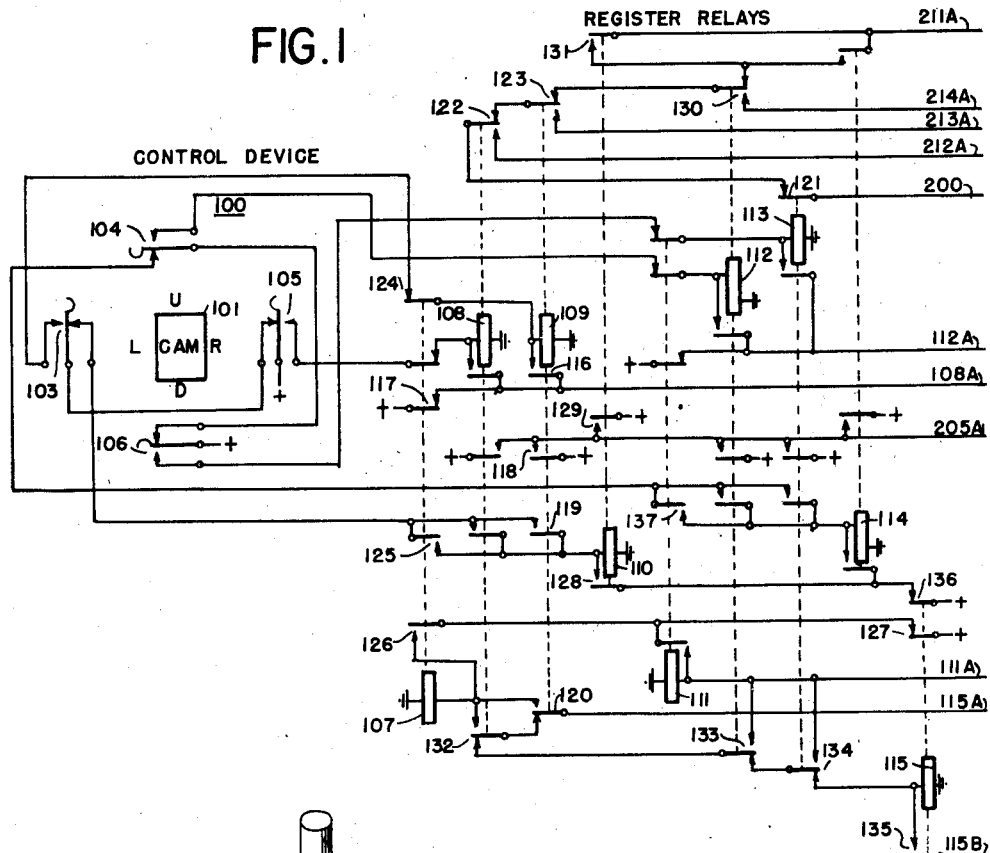
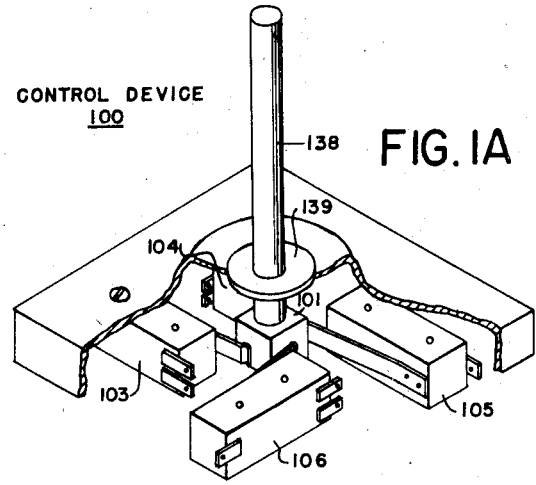
INVENTOR.
HARRY G. EVERS
BY
ATTORNEY Nov. 4, 1947.  H. G. EVERS  2,430,284
REMOTE CONTROL SYSTEM
Original Filed Aug. 3, 1944   3 Sheets-Sheet 2
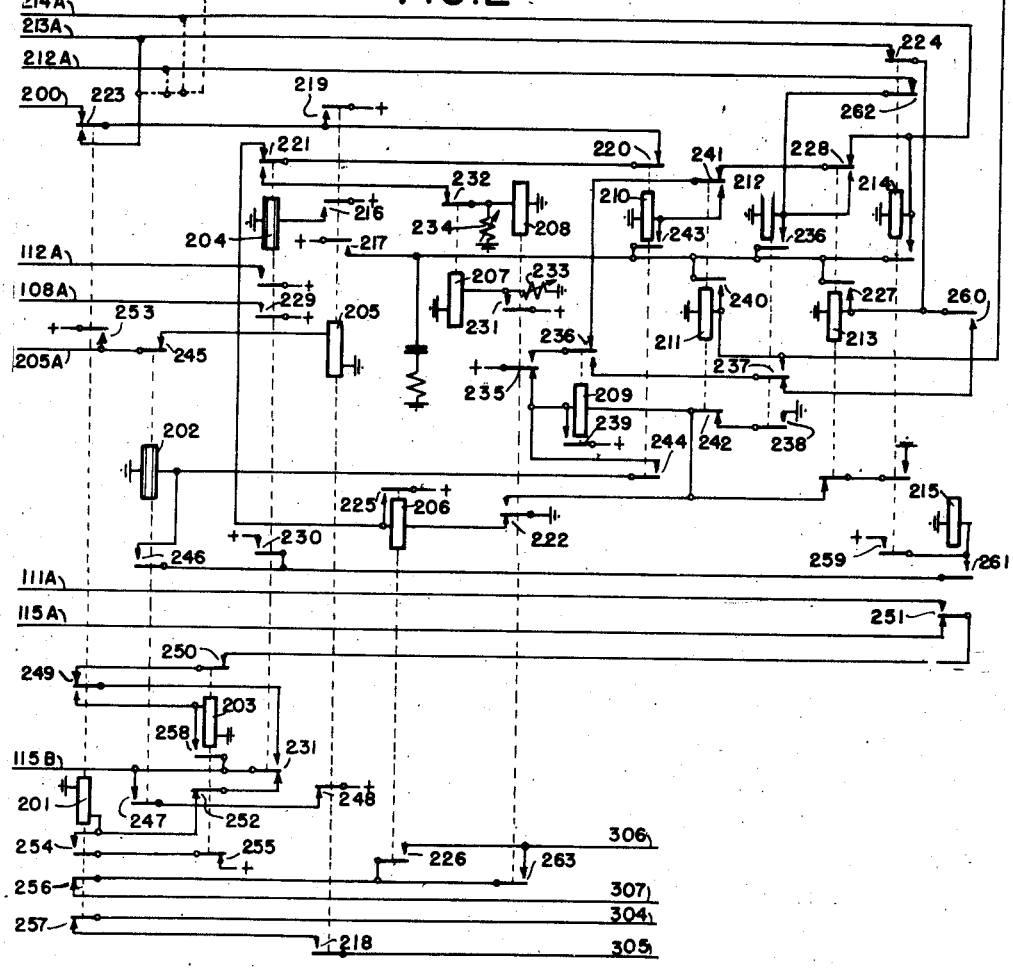
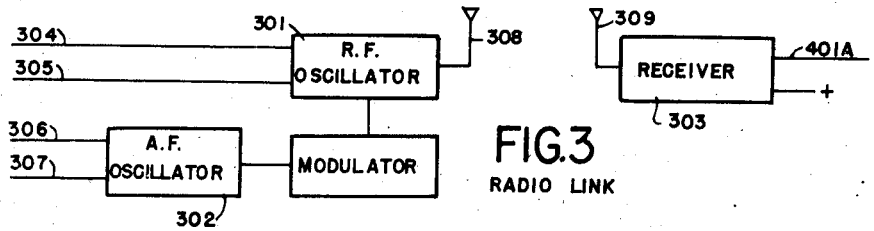
INVENTOR.
HARRY G. EVERS
BY
ATTORNEY Nov. 4, 1947.   H. G. EVERS   2,430,284
REMOTE CONTROL SYSTEM
Original Filed Aug. 3, 1944   3 Sheets-Sheet 3

CONTROL RELAYS

INVENTOR.
HARRY G. EVERS
BY
ATTORNEY

Patented Nov. 4, 1947

2,430,284

UNITED STATES PATENT OFFICE 2,430,284

REMOTE-CONTROL SYSTEM

Harry G. Evers, Newark, N. J., assignor to Automatic Electric Laboratories, Inc., Chicago, Ill., a corporation of Delaware Original application August 3, 1944, Serial No. 547,955. Divided and this application July 16, 1945, Serial No. 605,419

7 Claims. (Cl. 177—380)

The present invention pertains to impulse transmitters for automatically transmitting codes, each consisting of a series of impulses, in response to the closing of corresponding control circuits.

The present case is a division of my copending application, Serial No. 547,955; filed August 3, 1944; entitled Remote control systems.

The principal object of the present invention is to provide an improved impulse transmitter and an associated register that will transmit codes in the same sequence in which the corresponding control circuits are closed even though they may both be closed before the impulse transmitter has started to transmit.

A further object of the invention is to provide an impulse transmitter and an associated register that will transmit codes in a predetermined sequence when the corresponding control circuits are closed simultaneously.

A feature of the invention is the provision of an improved impulse transmitter including a chain of counting relays wherein one of the counting relays is operated to select a code, the succeeding relays being sequentially operated to transmit the selected code, and wherein one of the counting relays is then reoperated and the cycle repeated without transmitting any code to provide a variable spacing interval between successive codes.

In the specific embodiment of the invention herein described the invention is used to control the flight of an airplane from a ground station or from a second airplane by means of a radio link. The invention has been illustrated by schematic diagrams comprising Figs. 1 to 4, in which:

Fig. 1 is a schematic diagram of the control device and the associated register relays, Fig. 1A illustrates the construction of the control device, Fig. 2 shows the automatic code sender, Fig. 3 is a block diagram of the radio link, Fig. 4 shows the control relays which are located in the controlled plane.

The control device 100 illustrated in Fig. 1A comprises a shaft 138 supported by and extending through a flexible rubber mounting 139 which normally holds the shaft 138 in a vertical, or neutral, position. One end of this shaft serves as a handle and the opposite end carries a cam 101. Four snap-action switches 103 to 106 are mounted around the cam and are spaced 90° apart. The flexible mounting permits movement of the cam from its neutral position so as to operate any one of the switches individually or so as to operate any two adjacent switches simultaneously. The handle of the control device simulates the control stick normally used to control the flight of an airplane, the movement of the handle to operate any of the four switches corresponding to the movement of a control stick in an airplane to control the rudder and elevators.

The relay equipment shown at the right of the control device in Fig. 1 consists of two relay registers, each capable of storing one of two control signals and a release signal. One of these relay registers is associated with switches in the control device which are operated by upward or downward movement of the cam and the second relay register is associated with the remaining two switches which are operated by lateral movement of the cam. The purpose of these two relay registers is to determine what code the automatic code sender should transmit and in the case of a series of codes to determine the sequence in which the series of codes are transmitted.

The automatic code sender and interval timer shown in Fig. 2 consists of a pair of pulse generating relays 207 and 208, a series of counting relays 210 to 214, start relays 204 and 205, spacing relays 201 and 203, and several auxiliary relays. Whenever the start relays are operated by the relay registers the pulse generating relays operate to generate impulses. The register relays also cause a particular one of the counting relays to operate. The impulses generated by the pulse generating relays cause the counting relays succeeding the particular counting relay operated by the register relays to be operated one at a time. When the last counting relay operates it stops the operation of the pulse generating relays. The number of impulses generated thus depends on the particular counting relay operated by the relay registers. The impulses are transmitted to the controlled plane simultaneously with the operation of the counting relays. At the conclusion of each series of impulses the spacing relays cause the pulse generating relays and the counting relays to go through another cycle of operations without transmitting any impulses to the controlled plane. This spacing interval serves two purposes, first it provides time for the control relays in the controlled plane to reset themselves after a series of impulses so as to be prepared for a second series, and secondly it provides for the operation of an apparatus unit in the controlled plane for a definite time interval in response to only a momentary operation of the corresponding switch in the control device.

The radio link, which serves as the control channel in this particular application of the invention, has been shown in block form in Fig. 3 as the details of this equipment form no part of the invention. Fig. 3 indicates that the radio frequency oscillator 301 and the audio frequency oscillator 302 used to modulate the radio frequency carrier are both controlled by the automatic code sender. This control may be effected by any of the numerous methods familiar to those versed in the art. Similarly any familiar method may be used for deriving a direct current from the audio signal in the receiver 303 of the controlled plane to operate a relay.

The control relay circuit shown in Fig. 4 comprises an impulsing relay 401, lock pulse relay 402, counting relays 406 to 410, pulse directing relay 403, slow release relays 404 and 405, register relays 411 to 414, and release relay 415. When the automatic code sender at the control station operates it starts the radio frequency oscillator to generate the carrier wave and causes the audio frequency oscillator to operate intermittently in accordance with the code to be transmitted. The carrier wave with the audio signal superimposed on it is transmitted to the controlled plane where the signal is demodulated and the audio component is rectified to furnish a direct current to the impulsing relay 401 of Fig. 4, which is thus caused to repeat the impulses to the counting relays. One of the counting relays is operated for each impulse received. At the end of the series of impulses a momentary circuit is completed, through contacts of the last counting relay operated, to the corresponding register relay or to the release relay. When a register relay is operated by this momentary circuit it locks itself operated under the control of the release relay and closes an operating circuit to its corresponding apparatus unit. The register relay remains operated until a release code is received, which may not occur until other register relays have been operated. Each of the register relays corresponds to one of the switches in the control device, the object being to operate the register relays in accordance with the condition of the switches in the control device. Whenever any of the switches in the control device is released the release relay in Fig. 4 is operated and it releases the register relays. If two switches in the control device have been operated and then only one is released the release relay in Fig. 4 will operate to release both of the corresponding register relays in the controlled plane but the automatic code sender at the controlling station will immediately cause the re-operation of the register relay in the controlled plane corresponding to the switch which remains operated.

The contacts of the register relays in Fig. 4 may be used as shown to control reversible electric motors 416 and 417 which are arranged to control the position of the rudder and elevators of the controlled plane through suitable gearing and mechanical couplings. Limit switches may also be provided for these motors to restrict the motion of the rudder and elevators within any desired limits.

The operation will now be described in greater detail with reference to the accompanying drawings. The operation of Figs. 1 and 2 may be followed conveniently if they are placed side by side with Fig. 1 on the left. In Fig. 1 it will be seen that for each of the four switches 103 to 106 there is provided a corresponding register relay 109, 112, 108 and 113, and that a release relay 110 or 114 is provided for each pair of switches.

The circuit to relay 110 is normally open at contacts of relays 107 to 109, and the circuit to relay 114 is likewise normally open at contacts of relays 111 to 113. Assuming that it is desired to cause the controlled plane to turn to the left, the operator moves the handle of the control device so as to cause the cam 101 to operate switch 103, which causes the operation of relay 109 over an obvious circuit.

Relay 109 operates and closes its locking circuit through contacts 116 to contacts 117 of relay 107, closes a circuit to the start relay 205 over lead 205A at contacts 118, prepares a circuit to relay 110 at contacts 119, prepares a circuit to relay 107 from lead 115A at contacts 120, and prepares a circuit to counting relay 213 over lead 213A from lead 209 at contacts 123. Relay 205 operated, closes a circuit to relay 204 at contacts 216, prepares a locking circuit for the counting relays at contacts 217, closes a circuit at contacts 218 to connect leads 304 and 305 to start the radio frequency oscillator 301, and closes circuits to relays 213 and 206 at contacts 219. The circuit for relay 206 may be traced from + battery at contacts 219 through contacts 220 of relay 216, contacts 221 of relay 204, through relay 206 to ground at contacts 222 of relay 208. The circuit for relay 213 may be traced from + battery at contacts 219 through contacts 222 of relay 201, lead 209, contacts 121 of relay 113, contacts 122 of relay 108, contacts 123 of relay 109, lead 213A, contacts 224 of relay 214 to relay 213. Relay 206 operates, closes its locking circuit at contacts 225, and connects leads 306 and 307 at contacts 226 to start the audio frequency oscillator 302. Relay 213 operates, closes its locking circuit at contacts 227 to contacts 217 of relay 205, and prepares a circuit to the succeeding counting relay 212 at contacts 228. Relay 204 operates, opens the operating circuit for relay 206 and closes a circuit to relay 203 at contacts 221, closes a second locking circuit for relay 109 over lead 109A at contacts 229, prepares locking circuits for relays 202 and 215 at contacts 230, and prepares a circuit for relay 107 over lead 115A at contacts 231.

Relay 203 operates and closes a circuit to relay 207 at contacts 231. Relay 207 operates and opens the circuit to relay 203 at contacts 232. Relay 203 restores and opens the circuit to relay 207 which restores and re-closes the circuit to relay 203. This cycle of operations continues as long as + battery is available from contacts 219 of relay 205 to operate relay 203. The release times of relays 207 and 203 can be adjusted by means of adjustable shunting resistors 233 and 234, respectively, to secure the desired speed of operation and optimum per cent closure time of the contacts of relay 203. The first operation of relay 203 opens the circuit to relay 205 at contacts 222, closes a multiple circuit to leads 306 and 307 at contacts 203, and closes a circuit to relay 212 at contacts 235 through contacts 236 of relay 209 and contacts 228 of relay 213. Relay 206 restores. Relay 212 operates, closes its locking circuit at contacts 236, prepares a circuit to relay 211 at contacts 237, and prepares a circuit to pulse directing relay 209 at contacts 238. The first restoration of relay 208 opens the circuit between leads 306 and 307 at contacts 263 to interrupt the operation of the audio frequency oscillator 302, opens the operating circuit to relay 212 and closes an obvious circuit to relay 209 at contacts 235.

Pulse directing relay 209 operates, prepares a circuit for relay 211 at contacts 236 through contacts 237 of relay 212, and closes its own locking circuit at contacts 239. The second operation of relay 208 closes a multiple circuit to relay 209 at contacts 222, closes a circuit to relay 211 at contacts 235, and recloses the circuit between leads 306 and 307 at contacts 263. Relay 211 operates, closes its locking circuit at contacts 240, prepares a circuit to relay 210 at contacts 241, and opens the operating circuit to relay 209 at contacts 242. The second restoration of relay 208 opens the circuit to relay 209 at contact 222, opens the operating circuit to relay 211 at contacts 235, and again interrupts the operation of the audio frequency oscillator at contacts 263. Relay 209 restores and prepares a circuit to relay 210 through contacts 241 of relay 211. The third operation of relay 208 closes the circuit to relay 210 at contacts 235 and closes the circuit to the audio frequency oscillator 302 at contacts 263 for the third time. Relay 210 operates, closes its locking circuit at contacts 243, prepares a circuit to relay 202 at contacts 244, and opens a second point in the circuit to relay 208 at contacts 220 to prevent any further cycling of relays 207 and 208. When relay 208 restores for the third time it closes a circuit to relay 202 at contacts 235 through contacts 244 of relay 210, and opens the circuit to the audio frequency oscillator 302 at contacts 263. Relay 202 operates, opens the circuit to relay 205 at contacts 245, closes its locking circuit at contacts 246, and prepares a circuit for relay 107 over lead 115A at contacts 247. Relay 205 restores, opens the circuit to the radio frequency oscillator 301 at contacts 218, opens the circuit to relay 204 at contacts 216, opens the locking circuit to the counting relays at contacts 217, and closes a circuit to relay 107 at contacts 248. This last circuit may be traced from contacts 248 through contacts 247 of relay 202, contacts 231 of relay 204, contacts 249 of relay 201, contacts 250 of relay 203, contacts 251 of relay 215, lead 115A, contacts 120 of relay 109 to relay 107. Counting relays 210, 211, 212, and 213 restore. Relay 107 operates, opens the operating circuit for relay 109 at contacts 124, opens the first locking circuit for relay 109 at contacts 117, prepares a second circuit path to relay 110 at contacts 125, and closes its locking circuit at contacts 126 to contacts 127 of relay 115. Relay 204 restores, opens the second locking circuit for relay 109 over lead 108A at contacts 229, opens the locking circuit for relay 202 at contacts 230, opens the operating circuit to relay 107 over lead 115A and closes the circuit to relay 201 at contacts 231. The last circuit may be traced from contacts 248 of relay 205, through contacts 247 of relay 202, contacts 231 of relay 204, contacts 252 of relay 203 to relay 201. Relay 109 restores and prepares a circuit to relay 115 from lead 115A. Relay 201 operates, opens the marking lead 200 to the register relays of Fig. 1 and prepares a circuit to relay 213 at contacts 223, prepares a circuit to relay 205 at contacts 253, prepares a circuit to relay 203 at contacts 249, closes its locking circuit at contacts 254 to contacts 255 of relay 203, and opens points in the circuits between leads 306 and 307 and between leads 304 and 305 at contacts 256 and 257 respectively, to prevent operation of the radio equipment during the spacing interval. Relay 202 restores, opens the operating circuit to relay 201 at contacts 247, and closes a circuit to relay 205 at contacts 245 through contacts 253 of relay 201.

Relays 205, 204, 213, 206, 208, 207, 212, 211, 210, and 209 operate in the same manner as previously described except that the operating circuit to relay 213 is now through contacts 223 of relay 201 instead of through contacts of the relays in Fig. 1. The operation of relay 202 and subsequent release of relay 205 after this second cycle of operations closes a circuit to relay 203 from contacts 248 of relay 205, through contacts 247 of relay 202, contacts 231 of relay 204, and contacts 249 of relay 201. Relay 203 operates, closes its locking circuit at contacts 258, and opens the locking circuit to relay 201 at contacts 255. Relay 201 restores and opens the operating circuit to relay 203 at contacts 249. Relay 204 restores and opens the locking circuit to relay 202 at contacts 230. Relay 202 restores and opens the locking circuit to relay 203 at contacts 247. Relay 203 restores. All relays are now released except relay 107 which remains locked to contacts 127 of relay 115.

The operation of the radio link and the control relays shown in Fig. 4 will now be described. It will be recalled that during the operation of the automatic code sender of Fig. 2 that leads 304 and 305 were connected during the first cycle of operations and that during this same cycle of operations leads 306 and 307 were closed three times during successive operations of relay 208. The closure of leads 304 and 305 caused the radio transmitter of Fig. 3 to produce a high frequency carrier which is radiated by aerial 308 and received through antenna 309 of the receiver 303 in the controlled plane. The reception of this carrier does not produce any output on lead 401A as yet. However, each time that leads 306 and 307 are closed the audio frequency oscillator 302 produces an audio signal which is used to modulate the high frequency carrier. The receiver 303 demodulates the modulated carrier to reproduce the audio signal. A direct voltage is then derived from the audio signal and is used to operate a sensitive relay which is included in the receiver. Contacts on this sensitive relay are used to close a circuit between leads 401A and + battery. By this means pulses of direct current are applied to lead 401A corresponding to the operations of relay 208 of the automatic code sender.

Referring now to Fig. 4, each pulse of current over lead 401A causes relay 401 to operate. On the first pulse relay 401 operates, closes its locking circuit at contacts 416, closes a circuit to relay 404 at contacts 417, and closes a circuit to relay 410 at contacts 418 through contacts 419 of relay 403, contacts 420 of relay 407, and contacts 421 of relay 409. A circuit to lock pulse relay 402 is also closed at contacts 418 of relay 401. By properly proportioning the resistance and number of turns used in the coil winding of relay 402 it can be made slower to operate than any of the counting relays 406 to 410, thus insuring that relay 401 will remain locked through contacts 422 of relay 402 until the counting relay has operated when the pulse of current on lead 401A is of short duration. Relay 410 operates, prepares its locking circuit at contacts 423, prepares a circuit to relay 409 at contacts 424, and prepares a circuit to relay 403 at contacts 425. Relay 402 operates, opens the locking circuit to relay 401 and closes a multiple circuit to relay 404 at contacts 422. Relay 404 operates, prepares a bleeder circuit to itself through resister 432 at contacts 426, closes a circuit to relay 405 at contacts 427, and closes a locking circuit for the counting relays at contacts 428. It should be noted here that the first impulse in each series produced by the automatic code sender is longer than the remaining impulse in order to insure that relay 404 has sufficient time to operate and prepare the locking circuit for the counting relays. Relay 405 operates and closes a multiple circuit for locking the counting relays at contacts 429. At the end of the first pulse of direct current on lead 401A the circuit to relay 401 is opened. Relay 401 restores, opens the operating circuit to relay 404 at contacts 417, opens the operating circuits to relays 402 and 410 at contacts 418, and closes a circuit to relay 403 at contacts 418 through contacts 430 of relay 409 and contacts 425 of relay 410. The circuit to relay 402 is maintained through contacts 419 of relay 403, contacts 420 of relay 407, contacts 421 of relay 409, contacts 423 of relay 410, and contacts 428 of relay 404. Relay 403 operates, closes its locking circuit at contacts 431, and opens the holding circuit for relay 402 and prepares a circiut to relay 409 at contacts 419. Relay 402 restores, opens the holding circuit to relay 404, and prepares the locking circuit to relay 401. The circuit to relay 404 is now completed through contacts 426 and resistor 432. Resistor 432 is high enough so that relay 404 cannot remain operated in series with this resistance indefinitely, but the release time of the relay is considerably increased by this bleeder circuit to insure its continued operation during the series of impulses.

Relay 401 operates on the second pulse of current over lead 401A, closes its locking circuit, closes a direct circuit to relay 404, closes a circuit to relay 402, and closes a circuit to relay 409 at contacts 418 through contacts 419 of relay 403, contacts 433 of relay 408, and contacts 424 of relay 410, and closes a holding circuit to relay 403 at contacts 434. Relay 409 operates, closes its locking circuit at contacts 435, prepares a circuit to relay 408 at contacts 421, and opens the operating circuit to relay 403 at contacts 430. Relay 402 operates, opens the locking circuit to relay 401 and closes a multiple circuit to relay 404 at contacts 422. Relay 401 restores either when its locking circuit is opened or when the pulse of current on lead 401A ceases, depending on which event occurs last. When it restores it opens the holding circuit for relay 403 at contacts 434.

Relay 403 restores, opens the holding circuit for relay 402 and prepares a circuit for relay 408 at contacts 419. Relay 402 restores. The third pulse of current over lead 401A operates relay 401 for the third time causing the operation of relays 408 and 402. The operation of relay 408 prepares a circuit to relay 403 at contacts 436 which is completed at contacts 418 of relay 401 when it restores for the third time. Relay 403 then operates and opens the holding circuit to relay 402 at contacts 419 which releases and opens the holding circuit to relay 404 at contacts 422. At this time relays 403, 404, 405, 408, 409, and 410 are operated. Relay 404 restores, opens the circuit to relay 405 and closes a circuit to relay 413 at contacts 427 through contacts 437 of relay 405, contacts 438 of relay 406, contacts 439 of relay 407, and contacts 440 of relay 408. Relay 413 operates, closes its locking circuit at contacts 441, prepares a locking circuit for relay 415 at contacts 442, and closes a circuit to motor 416 at contacts 443. Relay 405 restores, opens the operating circuit to relay 413 at contacts 437 and opens the locking circuit for the counting relays at contacts 429. Counting relays 408, 409, and 410 restore opening the circuit to relay 403 at contacts 436 causing it to restore.

All of the control relays are now normal with the exception of relay 413. The motor 416 operates to turn the rudder of the controlled plane so as to direct the plane to the left. The motor will continue to operate until the rudder reaches the limit of its travel as determined by the location of the corresponding limit switch with respect to the rudder.

The motor may be stopped at any intermediate point by restoring the cam 101 of the control device 100 to neutral. This operation brings about the release of relay 413 as will presently be described. The arc through which the rudder moves is thus determined by the length of time that the control device 100 is held in the operated position. Since it is difficult for an operator to estimate short time intervals the automatic code sender is arranged to provide a predetermined minimum time interval between operation and release signals so that the rudder can be moved through a small arc in response to only a momentary operation of the control device 100. This minimum time interval is introduced by the second cycle of operations of the pulse generating and counting relays of the code sender that was previously described. The duration of this time interval is determined by which one of the leads 211A to 214A that the make contact of contacts 223 is connected to as indicated by the dotted lines in Fig. 2.

The operation which brings about the release of relay 413 and thus stops the operation of motor 416 in the event that the rudder has not yet reached the limit of its travel will now be described. It will be remembered from the previous description that all of the equipment in Figs. 1 and 2 is at normal except switch 103 and relay 107. When the control device is restored to the neutral position a circuit is closed to relay 110 at switch 103 through switch 105 and contacts 125 of relay 107. Relay 110 operates, closes its locking circuit at contacts 128, closes a circuit to relay 205 over lead 205A at contacts 129, and prepares a circuit to relay 211 over lead 211A from lead 200. Relays 204 to 208 operate the same as previously described except that the operation of relay 205 closes a circuit to relay 211 at contacts 219 instead of to relay 213 causing the operation of relay 211. This circuit may be traced from contacts 219 through contacts 223 of relay 201, lead 200, contacts 121 of relay 113, contacts 122 of relay 108, contacts 123 of relay 109, contacts 130 of relay 112, contacts 131 of relay 110, and over lead 211A to relay 211. Thus the first operation of relay 208 brings about the operation of counting relay 210 which prevents any further operation of relay 208 and thus permits only a single pulse of audio frequency modulation on the radio frequency carrier produced by the oscillator 301. When relay 205 restores following the operation of relay 202, as previously described, a circuit is closed to relay 115 at contacts 248 of relay 205 through contacts 247 of relay 202, contacts 231 of relay 204, contacts 249 of relay 201, contacts 250 of relay 203, contacts 251 of relay 215, lead 115A, contacts 120 of relay 109, contacts 132 of relay 108, contacts 133 of relay 112, and contacts 134 of relay 113. Relay 115 operates, closes its locking circuits at contacts 135 to lead 115B, opens the locking circuit to relay 110 at contacts 136, and opens the locking circuit to relay 107 at contacts 127. Relay 107 restores and opens the operating circuit to relay 110 at contacts 125 causing it to restore. Relay 204 restores, closes a circuit to relay 201 causing it to operate and opens the locking circuit to relay 202. Relay 202 restores, closes a circuit to relay 205, and opens the locking circuit to relay 115 at contacts 247. Relay 115 restores completing the restoration of Fig. 1 to normal. Relay 205 operates and causes the automatic code sender to go through a second cycle of operations to produce a spacing interval in precisely the same manner previously described. The single audio frequency pulse applied to the carrier by the operation of the automatic code sender causes a single pulse of direct current to be received over lead 401A of Fig. 4 to operate relay 401. Relays 401, 402, 404, 405, and 410 again operate as previously described. At the end of the pulse of current over lead 401A relay 401 restores and closes a circuit to relay 403 at contacts 418 through contacts 430 of relay 409 and contacts 425 of relay 410. Relay 403 operates and opens the holding circuit to relay 402 at contacts 419 which restores and opens the holding circuit to relay 404 at contacts 422. Relay 404 restores, opens the circuit to relay 405 and closes a circuit to release relay 415 at contacts 427 through contacts 438 of relay 406, contacts 439 of relay 407, contacts 440 of relay 408, contacts 444 of relay 409, and contacts 445 of relay 410. Relay 415 operates, closes its locking circuit at contacts 446, and opens the locking circuit to register relay 413 at contacts 447. Relay 413 restores, opens the locking circuit to relay 415 at contacts 442, and opens the circuit to motor 416 at contacts 443, if this circuit has not yet been opened by the limit switch. Relay 405 restores, opens the operating circuit to relay 415 at contacts 437, and opens the locking circuit to relay 410 at contacts 429. Relay 415 restores. Relay 410 restores and opens the circuit to relay 403 at contacts 425 causing it to restore. All relays in the system are now at normal.

It will now be apparent that if the control device was operated so as to cause a momentary operation of switch 103 the operation would still be exactly the same except that relay 110 would be operated early in the cycle and would cause the automatic code sender to send the release code, consisting of a single impulse, immediately after the spacing interval. The motor 416 would then be operated for a length of time equal to the spacing interval. Such a momentary operation of the control device may be repeated as often as desired to cause movement of the rudder of the controlled plane in discrete steps.

When the control device 100 is operated so as to cause cam 101 to operate switch 105 the operation is similar to that described for the operation of switch 103 except that relay 108 is operated in place of relay 109 and it causes counting relay 212 to be operated in place of relay 213 when relay 205 operates. As a result the first operation of relay 208 operates relay 211 and the second operation operates relay 210 to stop futher impulsing. Two pulses of audio frequency modulation are thus applied to the carrier to cause two operations of relay 401 in the controlled plane. These two operations of relay 401 cause counting relays 408 and 409 to be operated so that when relay 404 restores a circuit is completed to register relay 414 through contacts 444 of relay 409. The operation of relay 414 completes a circuit to motor 416 through a separate field winding causing it to run in the reverse direction to move the rudder so as to direct the controlled plane to the right. The release of relay 414 is brought about by the operation of relay 415 the same as previously described when the control device 100 is returned to neutral.

In a similar manner the operation of the control device to the up or down positions causes the automatic code sender to deliver a series of four or five impulses to the audio frequency oscillator 302 in response to the operation of switches 104 or 106 respectively. The operation of relays 111 to 114 which are associated with these switches is the same as that of relays 107 to 110 except that a different one of the counting relays in the code sender is made to operate first. When relay 112 is operated a circuit is prepared through contacts 130 and lead 214A to operate relay 214 as soon as relay 205 operates. An impulse is thus produced for each of the remaining counting relays 210 to 213. When relay 113 is operated none of the counting relays is operated by the operation of relay 205 and consequently five impulses will be produced by the automatic code sender. The first impulse will operate relay 214 and the fifth impulse will operate relay 210. In either case relay 214 will be operated and will close a circuit to relay 215 at contacts 259. Relay 215 upon operating prepares a circuit to operate relay 213 on the succeeding operation of relay 208 at contacts 260, closes its locking circuit at contacts 261, and prepares a circuit to operate relay 111 over lead 111A at contacts 251 at the end of the series of impulses. When four impulses are transmitted relay 407 will be the last counting relay operated in Fig. 4 and will cause a circuit to be closed to register relay 412 through contacts 439 upon the release of relay 404 at the end of the series. If five impulses are transmitted relay 406 will also be operated causing the release of relay 404 to close a circuit to register relay 411. Relay 406 performs an extra function by opening the holding circuits for relays 401 and 404 at contacts 448. This is a precaution to prevent a lockup from occurring if more than five impulses are delivered to relay 401 through a false operation. The operation of relays 411 and 412 controls the operation of motor 417 to move the elevators of the controlled plane in the same manner as described for motor 416 in connection with the rudder.

Simultaneous operation of relays 411 and 412 or of relays 413 and 414 is prevented by the relay registers associated with the control device. For example, if cam 101 is moved so as to operate switch 104 and then is immediately moved to operate switch 103 both relays 108 and 109 will be operated. Relay 110 will also become operated during the time that the cam is being shifted from switch 105 to switch 103. In this case a code consisting of two impulses will first be transmitted to operate relay 414. The operation of relay 107 and the release of relay 204 at the end of the first cycle of operations of the automatic code sender will release both relays 108 and 109. Relay 110 remains locked to contacts 136 of relay 115 and causes the code sender to send a release code consisting of one impulse which causes the release of relay 414. The operation of relay 115 at the end of this cycle of operations of the code sender releases relays 107 and 110. The release of relay 107 recloses the circuit to relay 109 from switch 103 allowing it to reoperate and cause the code sender to transmit a code consisting of three impulses to bring about the operation of relay 413. Although this sequence of operations takes a considerable time to describe it actually occurs in a very brief interval inasmuch as it has been found entirely practical to operate the equipment at a speed of thirty-five impulses per second and the longest single code which need be transmitted consists of five impulses.

The relay registers of Fig. 1 also control the sequence in which codes are transmitted when the control device is operated so as to actuate two adjacent switches simultaneously. This occurs when it is desired to cause the controlled plane to climb or dive and to turn at the same time. If it is desired that the controlled plane climb and turn left at the same time the control device 100 is operated so that cam 101 is moved to operate switches 103 and 104. Relays 109 and 112 will both be operated. The code for a left turn will be sent first due to marking of the counting relays by contacts 123 of relay 109. Relay 107 will be operated after this code has been transmitted and relay 109 will be released when its locking circuit over lead 106A is opened by the release of relay 204. After the spacing interval has been timed by the code sender the code corresponding to a climb will be transmitted due to the marking of the counting relays by contacts 130 of relay 112. At the end of this second code relay 111 will be operated and relay 112 will be released. The transmission of this second code brings about the operation of relay 412. Both motors 416 and 417 will now be operating simultaneously. If the control device is returned to release relays 110 and 114 will be operated and will cause the code sender to send the release code to operate relay 415, thus releasing relays 412 and 413 to stop both motors. However, if it is desired to stop only one motor the control device may be operated to move cam 101 from the position where both switches 103 and 104 are operated to a position where only one of the switches is operated without releasing the switch which remains operated. For example, in the above case the cam can be moved so that switch 103 remains operated but switch 104 is released. Relay 114 will then be operated through switches 106 and 104 and through contacts 137 of relay 111. The operation of relay 114 causes the code sender to transmit a release code which will bring about the operation of relay 415 and consequent release of relays 412 and 413. Relay 115 will be operated after this code is sent and will cause the release of relays 107, 111, and 114. The release of relay 107 re-closes the circuit to relay 109 from switch 103 which causes the code sender to re-transmit the code for a left turn and thus causes the immediate re-operation of relay 413. The operation of motor 416 is thus only momentarily interrupted and the operation of motor 417 is stopped completely.

In the preceding paragraph it was assumed that switches 103 and 104 were operated simultaneously. This would cause the coded signal for a left turn to be transmitted first due to the preference given to this code in the marking chain. The sequence can be reversed by causing switch 104 to be operated slightly ahead of switch 103. This will permit relays 112 and 205 to become operated and thus cause the operation of relay 214 before relay 109 operates to interrupt the operating circuit for relay 214 at contacts 123. The operation of relay 109 at this time will not alter the operation of the counting relays because the marking circuit extending from lead 200 through contacts 123 of relay 109 to lead 215A is opened at contacts 224 of relay 214. Contacts 202 serve a similar purpose when relay 108 is operated during the time that the code sender is transmitting an up or down signal. The code signals are thus transmitted in the same sequence that the control switches are operated in.

It will also be apparent from the preceding description that the cam 101 can be moved to operate one of the switches, say 104, to bring about the operation of the corresponding register relay 412, in the controlled plane and may then be moved so as to operate one of the adjacent switches, say 103, without releasing the first switch operated. This will cause the operation of the corresponding register relay 413, without releasing relay 412.

While the invention has been described in connection with a radio link it is obvious that it may be used without such a link in other applications. If the radio link is omitted lead 306 of Fig. 2 is connected to lead 401A of Fig. 4 and lead 307 is connected to + battery of Fig. 4. Leads 304 and 305 are not required for this mode of operation.

Having described and illustrated the invention what is considered new and is desired to secure by Letters Patent is pointed out in the subjoined claims.

What is claimed is:

1. In combination with a code transmitter comprising a chain of counting relays and impulsing means therefor, a plurality of register relays each being associated with different ones of said counting relays, means for at times operating a plurality of said register relays simultaneously, means responsive to the operation of said register relays causing the operation of one of the associated counting relays and causing the succeeding counting relays to be operated in sequence by said impulsing means, and means controlled by said counting relays causing the release of the particular register relay that is associated with the counting relay first operated.

2. In combination with a code transmitter comprising a chain of counting relays and impulsing means therefor, a plurality of register relays each being associated with different ones of said counting relays, a first means for operating one of said register relays, circuit arrangements causing the operation of the counting relay associated with said one register relay in response to its operation and causing the succeeding counting relays to be operated in sequence by said impulsing means, and a second means controlled by one of said succeeding counting relays causing the release of said one register relay and the operated counting relays.

3. In combination with a code transmitter as claimed in claim 2, a third means for operating a second of said register relays, said circuit arrangements causing the operation of the counting relay associated with said second register relay in response to its operation and causing the succeeding counting relays to be operated in sequence by said impulsing means, and a fourth means controlled by said one of the succeeding counting relays causing the release of said second means.

4. A code transmitter comprising a chain of relays and normally inactive impulsing means therefor, a first means for operating any one of the relays in said chain and for starting said impulsing means, circuit arrangements causing the relays in the chain succeeding said one relay to be energized in sequence by said impulsing means, a second means for stopping the operation of said impulsing means when a particular relay in the chain is operated, an auxiliary circuit over which impulses are transmitted by said impulsing means during the above cycle of operations, a third means responsive to the completion of said cycle of operations for operating a particular one of the relays in said chain and for restarting said impulsing means, said circuit arrangements causing the relays in the chain succeeding said particular relay to be energized in sequence by said impulsing means, said second means stopping the operation of said impulsing means when said particular relay is again operated, said third means preventing transmission of impulses over said auxiliary circuit by said impulsing means during the second cycle of operations.

5. A code transmitter as claimed in claim 4 including strapping means for varying the connections of said relays to said third means to thereby determine which particular relay will be operated by said third means, thereby at times causing different ones of the relays in said chain to be operated by said third means, whereby the duration of said second cycle of operations may be varied.

6. A code transmitter comprising a chain of relays and normally inactive impulsing means therefor, a first means for operating any one of the relays in said chain and for starting said impulsing means, circuit arrangements causing the relays in the chain succeeding said one relay to be energized in sequence by said impulsing means, a second means for stopping the operation of said impulsing means when a particular relay in the chain is operated, a third means responsive to the completion of the above cycle of operations for operating a particular one of the relays in said chain and for restarting said impulsing means, said circuit arrangements causing the relays in the chain succeeding said particular relay to be energized in sequence by said impulsing means, said second means stopping the operation of said impulsing means when said particular relay is again operated, said third means disabling said first means during the second cycle of operations.

7. A code transmitter as claimed in claim 6 including strapping means for changing the connections of said relays to said third means, thereby at times causing different ones of the relays in said chain to be operated by said third means, whereby the duration of said second cycle of operations may be varied.

HARRY G. EVERS.

REFERENCES CITED

The following references are of record in the file of this patent:

UNITED STATES PATENTS

| Number | Name | Date |
|---|---|---|
| 1,708,933 | Beach | Apr. 16, 1929 |
| 1,745,072 | Wensley | Jan. 28, 1930 |
| 1,039,988 | Molina | Oct. 1, 1912 |
| 2,082,550 | Powell | June 1, 1937 |
| 2,172,596 | Saunders | Sept. 12, 1939 |
| 1,264,517 | Herink | Apr. 30, 1918 |